United States Patent Office 3,415,600
Patented Dec. 10, 1968

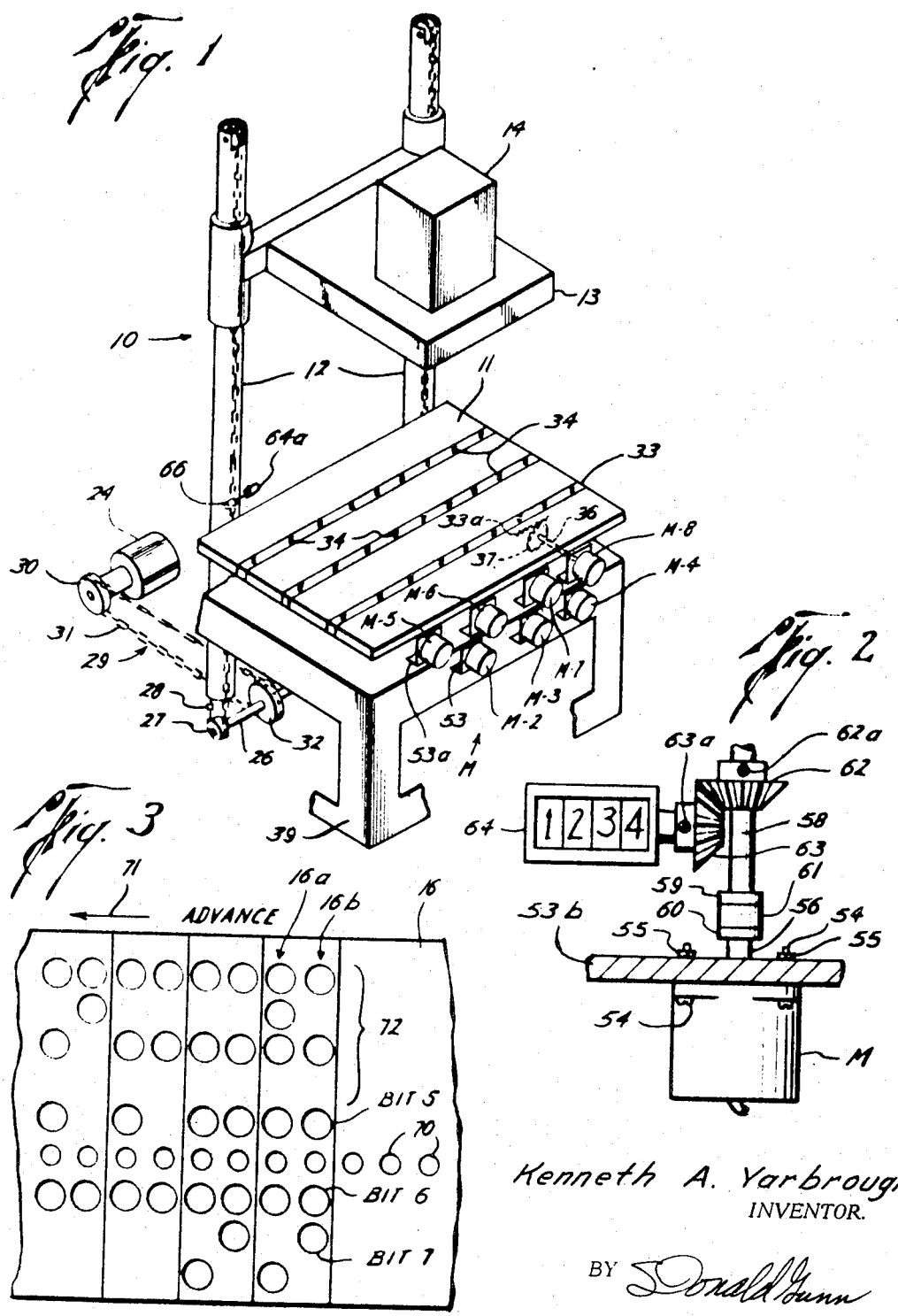

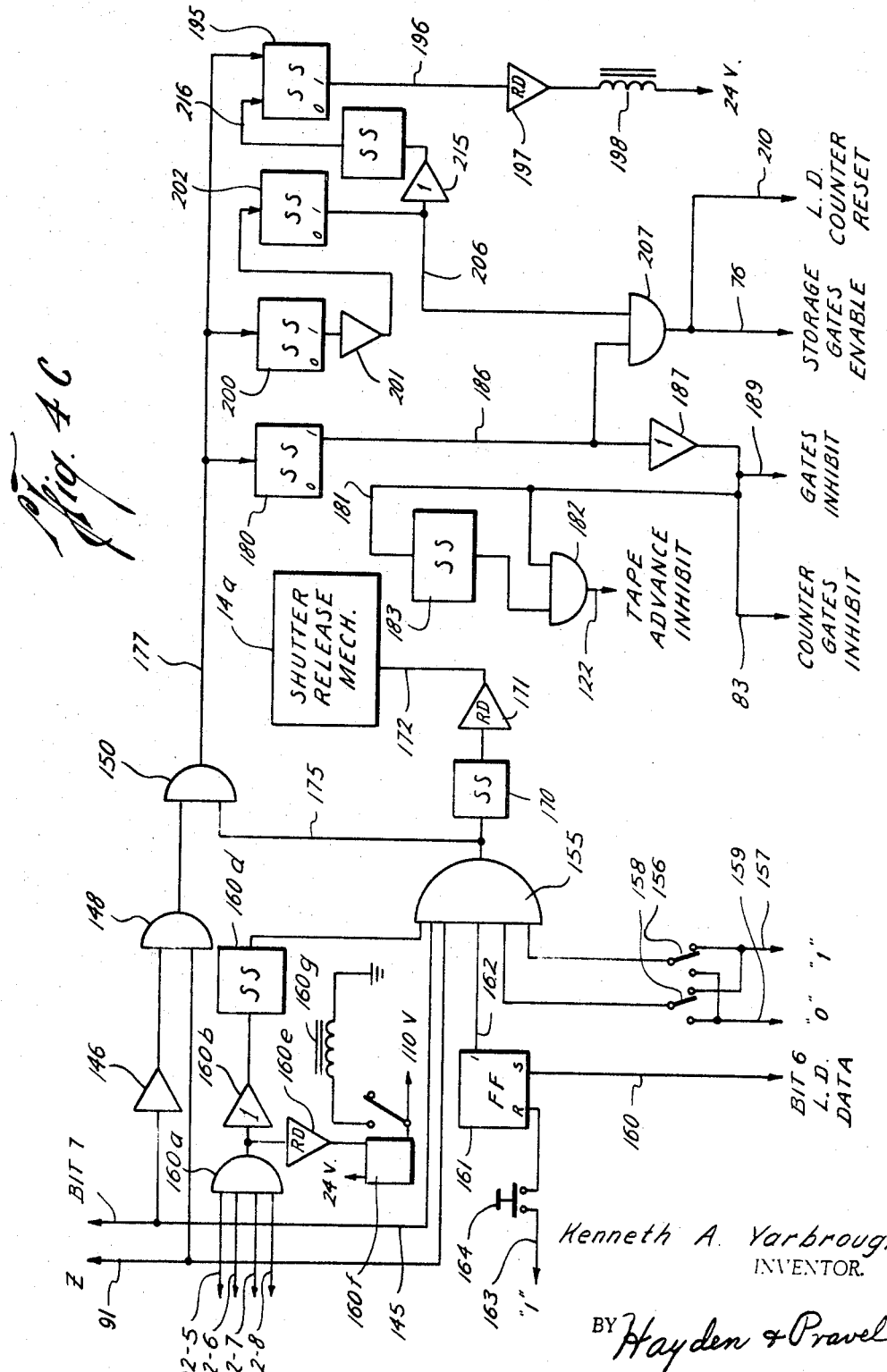

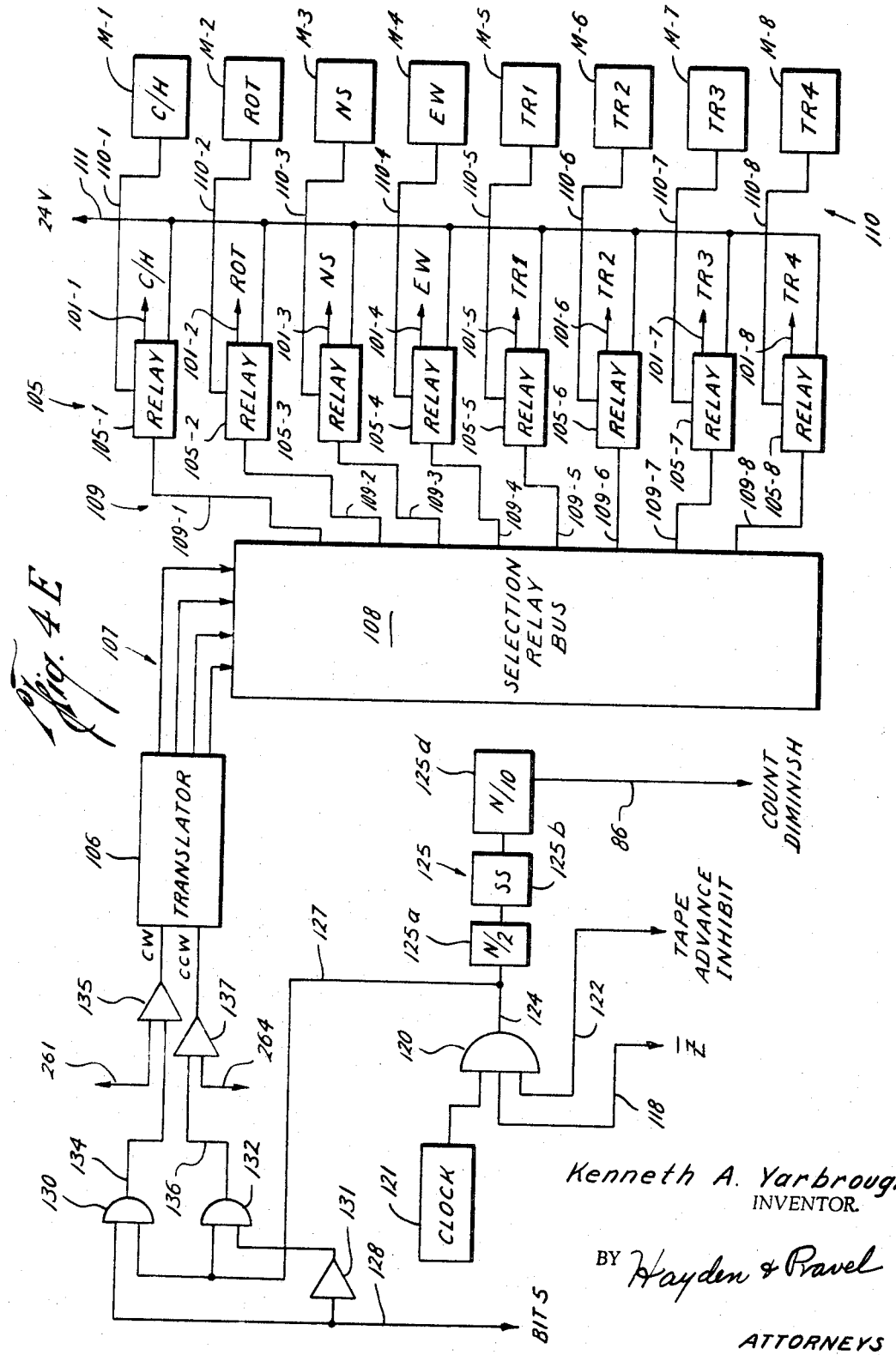

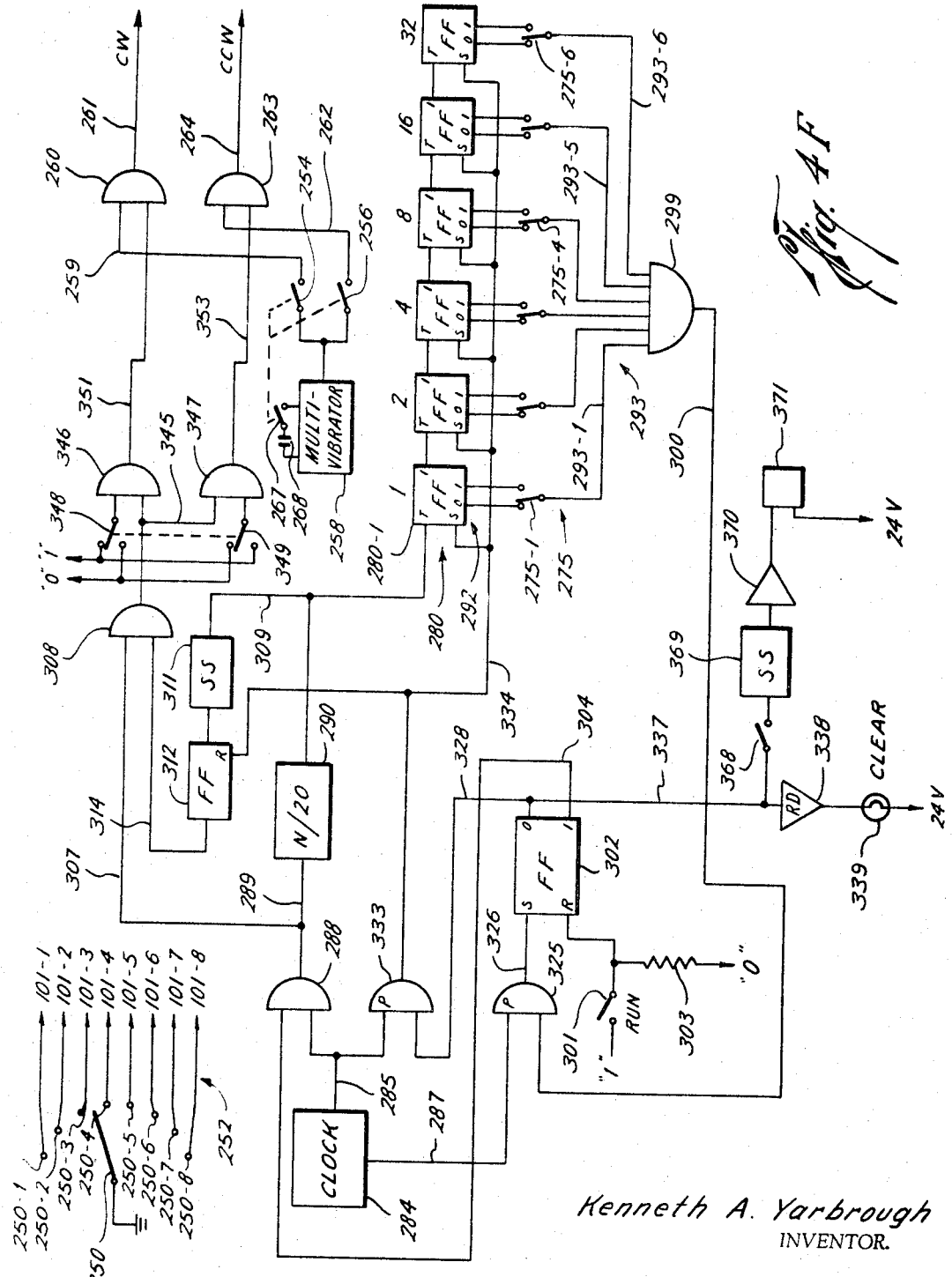

3,415,600
CONTROL DEVICE FOR CAMERA STAND
Kenneth A. Yarbrough, 1030 Medalist Drive,
Dallas, Tex. 75232
Continuation-in-part of aplication Ser. No. 364,640,
May 4, 1964. This application Mar. 2, 1967, Ser.
No. 633,644
7 Claims. (Cl. 352—87)

ABSTRACT OF THE DISCLOSURE

For operation of camera stands yielding animated film, control apparatus preferably including a tape reader which reads instructions encoded on punch paper tape, transfers the instructions to circuitry which distinguishes between first and second components of each instruction wherein the first component indicates the movable part of the camera stand to be operated and the second component of the instruction indicates a selected position of the movable part between two spaced positions, a plurality of stepping motors respectively connected to these movable parts, translator means for driving the selected stepping motor in response to the first component of the instruction with the second component of instruction controlling movement of the operable part of the camera stand to obtain the movement to the selected position.

*Related application*

The present invention is a continuation-in-part of application Ser. No. 364,640, filed May 4, 1964, now abandoned.

*Summary of problem and solution*

The production of a continuously moving image suitable for projection onto a moving picture screen or broadcast over television channels has found increasing favor for imparting information, knowledge and humorous impressions to the viewer of the image. It may be appreciated that one sees motion which is apparently natural when each frame of the strip of film providing the animation effects is viewed by illumination with lights in a motion picture projector or is scanned by electronic means in television broadcasting equipment with the motion resulting from slight incremental moves of various portions of the art work on the frames of the film strip. Extensive and laborious operations are necessary to produce a continuous film strip of animated motion or characters for utilization in training films, movies and cartoons for entertainment, or television commercials desiring special effects available only by way of this process.

Many problems exist in the filming of the continuous strip with a desire of yielding a calculated animation effect in a given number of frames of film. For instance, it may be decided in advance that a military training film will utilize animation effects to illustrate in color the flow of fluid through a pipe in one hundred frames. Such an animation effect has been achieved in the past by positioning the appropriate art work on the camera stand and releasing the shutter of the camera as is customarily done in filming motion pictures. The art work is moved during the filming operation by hand operated cranks connected to the art work through appropriate mechanical mechanisms with the cranks operated at an assumed rate of speed to produce the net movement in the designated number of frames. Quite often, each animation effect requires more than one attempt at manipulating the art work on the camera stand at the estimated rate to achieve the desired animation effect. Obviously, such a method of filming is crude at best.

The above mentioned example is in actuality simple when compared with the animation effects required for television commercials and movie cartoons or the like. Often, such effects require the variation of two, three or even more operable or movable parts of the camera stand so that the operator of the camera stand is required to operate more than one hand crank when the camera is running. The likelihood, in the event of multiple operation of the hand cranks to manipulate the art work on the table, is that the movable parts require different rates of operation and their rates are not necessarily constant during the film exposure. Thus, the complexity of the desired animation results in filmed effects having material variations from the effects initially desired and it might be appreciated that considerable editing and repeated exposure of various scenes is required to achieve what is, at best, only a compromise.

Other operations on animation camera stands have followed the above routine including the use of variacs or other variable power supplies to control the operation of multiple speed motors connected directly to the mechanical linkage of the camera stand to adjust the various parameters and thereby manipulate the art work. Even so, it is to be realized that such operation still yields only approximate results and requires considerable editing.

Another method of producing animation film strips involves the use of the mechanical linkage of the camera stand for moving the art work on the camera stand relative to the field of view of the camera at rates controlled by the operation of the hand crank. Thus, the operator of the camera stand is able to calculate the movement required between each frame of the film to be exposed and may operate each movable part of the camera stand involved to obtain the incremental movement between frames to position the art work immediately prior to exposing one frame of film. It may be appreciated that the filming of a thirty minute television show of animated characters requires an extremely long period of time utilizing this method of operation. Further, innumerable calculations are required throughout the filming of the desired animation effects and the operator is subjected to many mental calculations and operations which multiplicity of operations coupled with the length of the operations materially increases the likelihood of errors in operation. It may be appreciated that an error in operation will very likely ruin the scene being animated at the time and requires an extensive rerun and film editing to merge the rerun film in the film erringly exposed.

Quite often, animated film strips, and particularly those to be used as television commercials, may require repetitive exposures to achieve the total desired effect. Thus, the background may be initially filmed for an animation scene and the characters may be thereafter positioned on the camera stand, and the film strip will be re-exposed to place the character images on the background. Television commercials are particularly susceptible to multiple filming operations especially when it is desired to produce a filmed commercial for nationwide distribution for a plurality of sponsors in the same field which have trade names and goodwill extending only on a regional basis. For instance, a group of dairy concerns may cooperate to purchase a television commercial utilizing animation effects which will be identical except that the name of the particular dairy product may vary for various regions of the country. In such a situation, it is sometimes possible to make one master film incorporating all of the art work of the background of the commercial. This invention enables the use of a plurality of duplicates copied from the master film having the background thereon and exposed to add the images representing the brand names to each duplicate placed in the camera. The control device of this invention superimposes the art work including the name of each regional dairy product on the reproduction of the master film to thereby produce television commercial film having animation effects tailored to the needs and advertising of one sponsor. Also, it may be seen that the requirement for multiple exposures of a particular film strip is easily handled by the device of this invention whereas such operation by the prior art devices is almost impossible and can produce only an acceptable compromise between desired and achieved animation effects.

While the foregoing described the prior art obliquely, and the problem to be solved by the present invention is more specifically stated, the present invention is summarized as incorporating a reading device, preferably a tape reader, which responds to a programmed tape having instructions thereon. The instructions incorporate two components, one of which designates the operable part of the camera stand to be operated, and the second of which designates the extent of operation. The extent of operation is usually a measured distance between two spaced points, and in terms of animation, is a distance which a piece of art work is moved relative to the field of view of the camera stand. The instructions are transferred from the tape reader and the first component of the instruction selects the designated stepping motor for operating the camera stand to provide the predetermined movement or motion. The second instruction which controls the extent of operation of the movable part is stored in a register and diminished as the stepping motor is stepped. When the storage register is diminished to zero, this provides an indication that the selected stepping motor has operated the camera stand to provide the predetermined movement and that the camera stand is then ready to proceed to the next step in the animation program.

Therefore, an object of this invention is to provide a new and improved control system for a camera stand which automatically operates the camera stand and camera to produce an exposed sequence of frames of film achieving a desired animation effect.

An important object of this invention is to provide a new and improved control film-animation system including a camera stand and associated camera, with the system having circuitry which reads instructions carried by a medium and automatically responds to the instructions to position the art work on the camera stand and expose the film in the camera to photograph the art work, wherein the sequence of instructions achieves any desired animation effect when considering a sequence of frames of film so exposed.

An additional object of this invention is to provide a new and improved control system including an animation camera stand enabling precise repetition of art work sequences to obtain uniformity among a plurality of exposed film strips.

Yet a further object of this invention is to provide a new and improved control device for automating a camera stand and associated camera having operable parts and causing change in camera height, north-south location, east-west location, rotation, wherein the control system reads coded instructions on tape, automatically responds to the coded instructions to operate the desired movable part, operates the part by increments to achieve the total desired variation, and exposes the film at the appropriate time.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

FIG. 1 is a perspective view, somewhat schematic in nature, of a camera stand illustrating the relationship of the camera to the table on which the art work is positioned and further illustrating means of this invention connected to the camera stand for operating the various components of the camera stand;

FIG. 2 is a plan view of a stepping motor connected to the camera stand to operate the mechanical linkage of the camera stand and thereby transfer controlled movements to operable parts thereof and further illustrating a counter for ascertaining the relative position of the art work moved by the operation of the stepping motor;

FIG. 3 illustrates a portion of punched paper tape for transferring instructions to the control device of this invention;

Figure 4A:
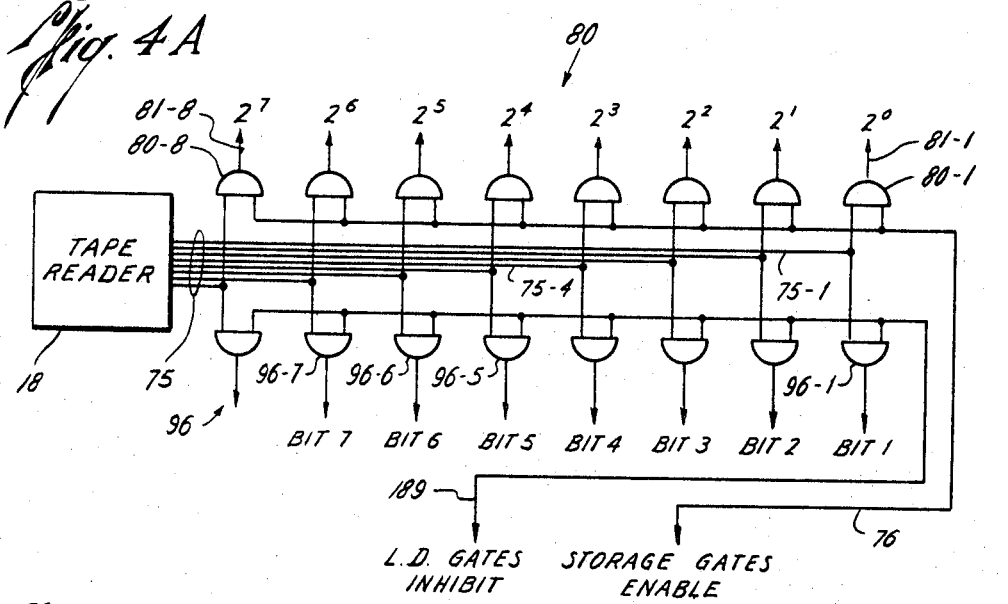
Figure 4B:
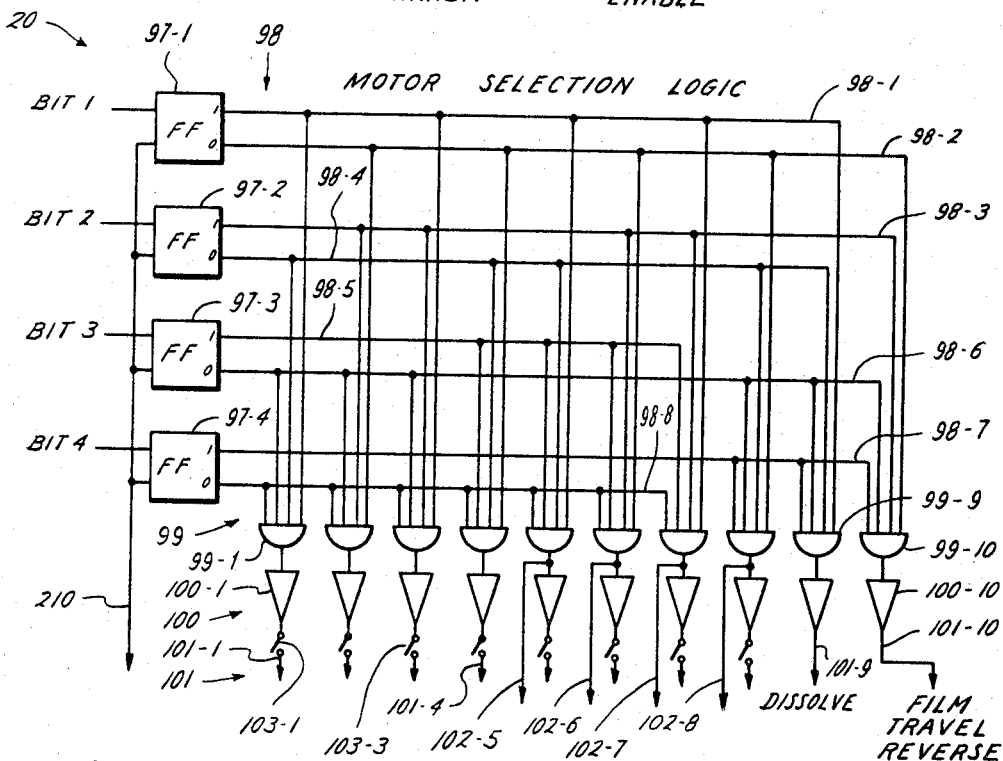
Figure 4D:
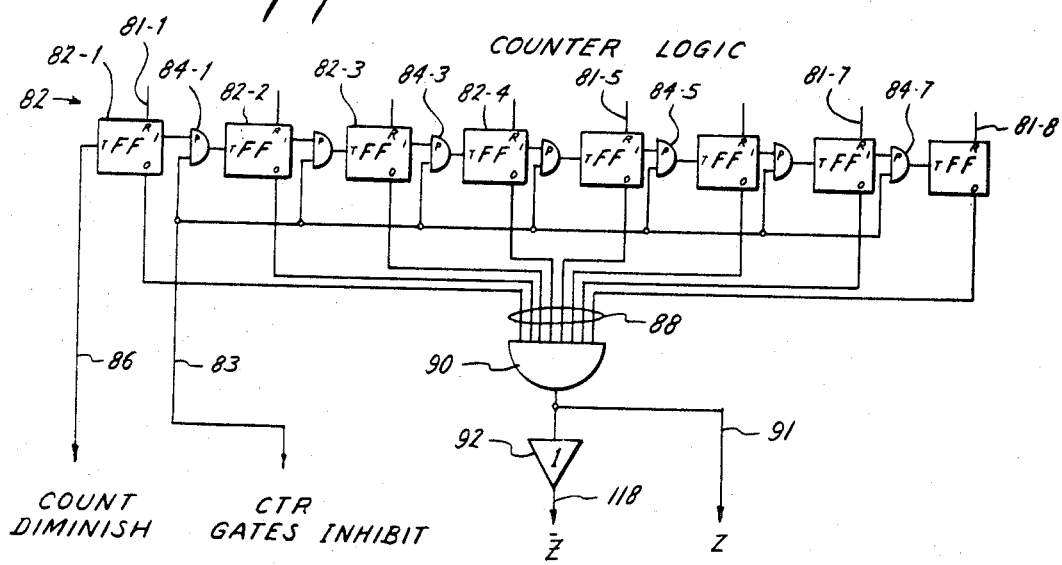
Figure 5:
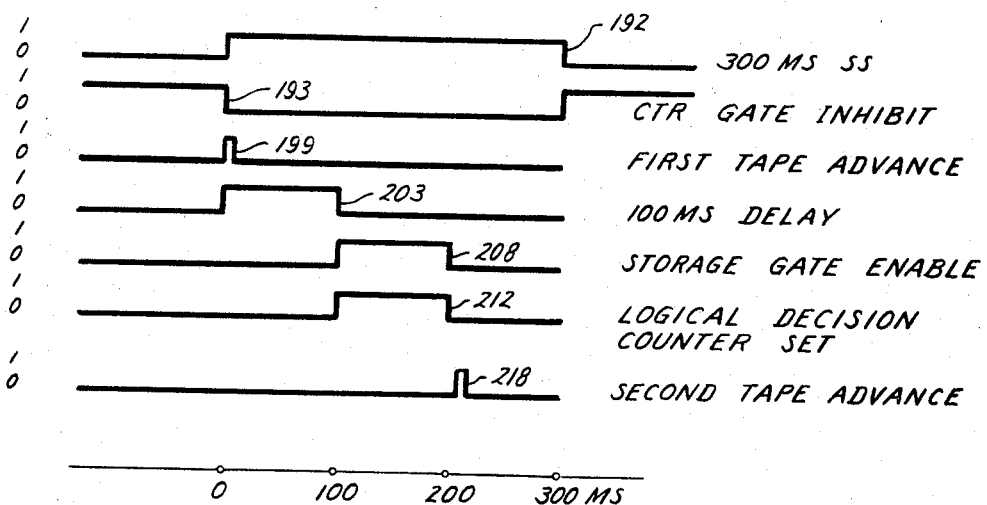

FIGS. 4A-4F together illustrate a schematic wiring diagram of the control apparatus of this invention; and, FIG. 5 is a timing chart correlating various operations of the invention.

Briefly, FIG. 1 illustrates a somewhat schematic representation of a camera stand 10 having a compound table 11, vertically extending columns 12, and carriage 13 adapted for receiving a camera 14 thereon. The camera stand is adapted to receive art work on the table 11 and the art work is positioned relative to the field of view of the camera 14 by movement of the compound table 11 whereupon the film in the camera 14 is exposed to form one image of a sequence to thereby achieve a desired animation effect. The apparatus of this invention functions in response to information on punched paper tape, a sample 16 being illustrated in FIG. 3, which is read by a tape reader 18 and the information is processed by the circuitry of this invention designated at 20. Signal responsive means such as a plurality of D-C stepping motors M are shown in FIG. 1 with means for transferring movements to the camera stand. In operation, the tape 16 is read by the tape reader 18 and the circuitry 20 forms various signals which are supplied to the stepping motors M to operate through the mechanical linkage of the camera stand to move the art work on the table 11 to achieve the desired animation effect.

Considering the invention more in detail, the camera stand illustrated in FIG. 1 is a conventional camera stand and includes the necessary lights, mechanical equipment and other paraphernalia necessary to form animated film sequences in the conventional manner set forth hereinabove. The control system of this invention is incorporated with the camera stand by connecting the D-C stepping motors M as will be described in more detail hereinafter.

An additional signal responsive means 24 similar to or identical to the motors M mounted on the camera stand 10 is connected to a drive shaft 26 extending between the vertical columns 12 and having drive sprockets 27 on each end for driving a link chain 28 extending upwardly along and interiorly of the vertical columns for moving the camera 14 on the carriage 13 relative to the camera stand table 11. A transmission 29 connects the motor 24 to the shaft 26 and preferably includes a drive pulley 30 cooperatively engaging a link chain 31 to drive a pulley 32 positioned on the shaft 26. It may be appreciated that other means may be utilized for transferring or connecting the controlled motive output by the motor 24 to the camera stand such as a worm drive or the like, subject only to the requirement that power be applied to both drive chains 28 to thereby move the camera 14 smoothly along the vertical columns 12.

Art work is customarily placed on the table 11 and may be attached to any one of a plurality of transversely extending movable tracks 33 having upwardly extending connective means 34 for securely attaching the art work to the movable tracks. Each of the movable tracks includes drive apparatus exemplified in FIG. 1 wherein a D-C stepping motor M-8 is positioned to drive a shaft 36 illustrated in dotted line and having a gear 37 mounted thereon. The gear 37 is meshed with the teeth of a rack gear 33a formed on the lower surface of the movable track 33. The remaining track drive motors are designated M-5, M-6 and M-7, and each one includes similar means for transferring motion to the movable tracks 33.

Figure 1A:
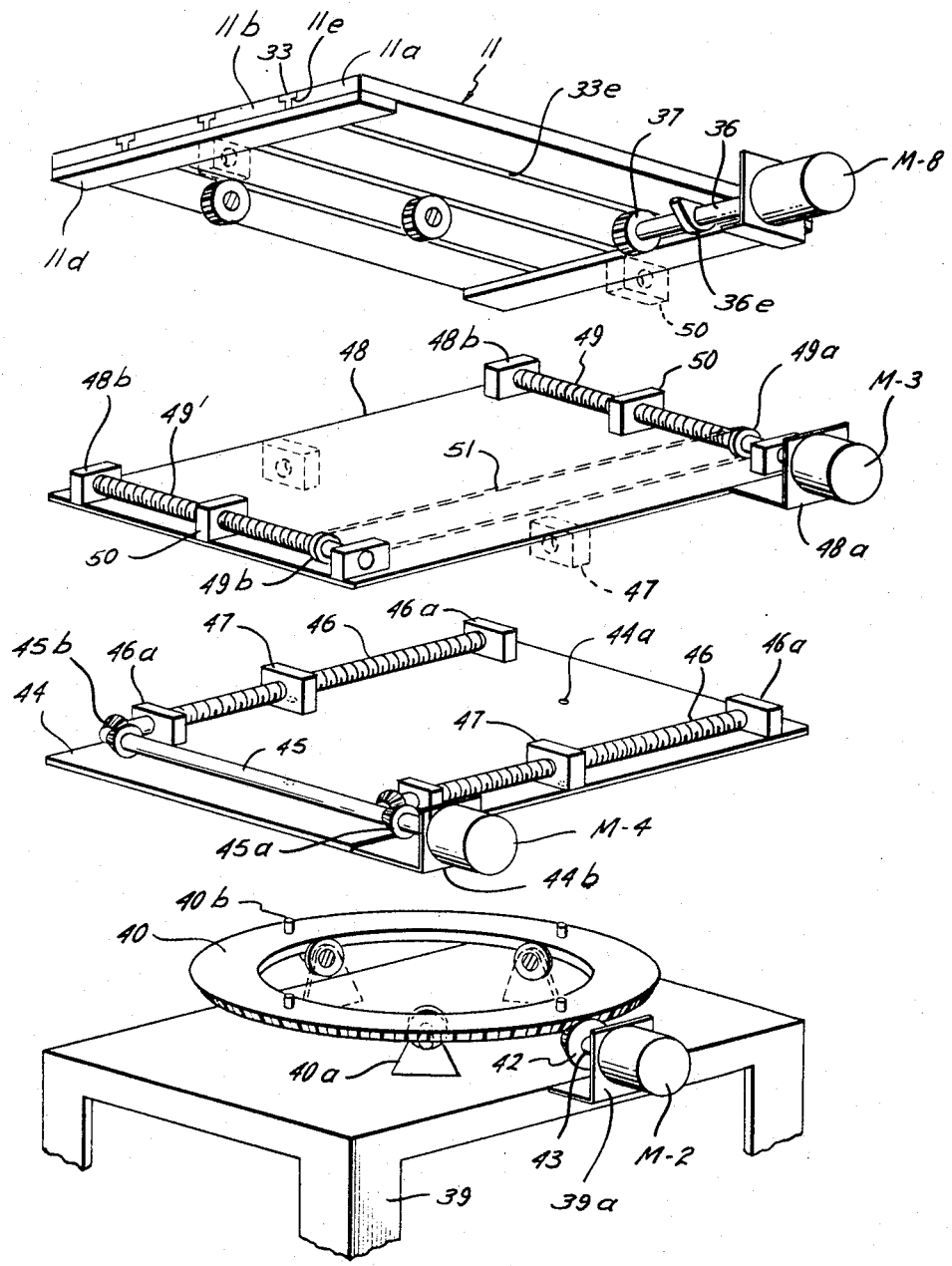
FIG. 1A is an exploded, perspective view of apparatus between the base and top of the camera stand.

The camera stand 10 additionally includes a base 39 on which the compound table 11 is supported. The drive motor M-2 is connected to rotate the table 11 relative to the field of view of the camera 14 and the motor M-3 is connected to move the table 11 toward or away from the vertical columns 12 at the rear which motion will be hereinafter designated as north-south motion. The motor M-4 is connected to translate the table 11 to the left or the right as viewed in FIG. 1 in a direction perpendicular to the motion imparted by the motor M-2, which motion is hereinafter designated as east-west motion. FIG. 1A illustrates in detail the means for producing compound motion in the above identified directions wherein the mechanism mounted on the base 39 and beneath the compound table 11 is fully disclosed.

In FIG. 1A, attention is first directed to the camera stand base 39 which is shown in the lower portions of the view. A rather large ring-gear 40 is provided for rotating the table top 11 carried thereabove as will be described. The ring-gear 40 is supported by at least three bearing wheels 40a at spaced locations on the base 39. It will be appreciated that the bearing wheels provide both support and alignment to the large ring-gear 40 to maintain the table 11 in a horizontal plane. Each of the bearing wheels preferably incorporates a free-rolling wheel mounted on an axle extending between a mounting clevis which is joined to the base 39 by means of welding or the like. If desired, the means 40a may be adjusted by providing shim stock between the base 39 and the clevis, and devices are also commercially available provided adjustment by vertical movement on a threaded shaft with appropriate locking means for securing the ring-gear 40 in a horizontal plane.

The motor M-2 is mounted on a support bracket 39a which is secured to base 39. The motor M-2 drives a rotatable shaft 43 communicating with a bevel gear 42 which is meshed with the bevel gear teeth on the large gear 40. The rotation imparted by the motor M-2 is communicated to the ring-gear 40 in the conventional manner through the gearing arrangement noted above.

The ring-gear 40 is secured to additional apparatus to be described providing the transverse movement to the table 11 by means of a plurality of connective pins 40b. The pins 40b each engage spaced openings 44a in a mounting plate 44 which is rested on the ring-gear and aligned therewith by the pins 40b. Preferably, clearance is maintained between the ring-gear 40 and the mounting plate 44 by placing washers or other suitable means about the alignment pins 40b to elevate the plate 44 relative to the gear 40. The plate 44 provides means for translating the table 11 to the left or the right as viewed in FIG. 1. The motor M-4 is joined to the mounting plate 44 by a bracket 44b in a manner which will be described in greater detail in FIG. 2. The motor M-4 is connected to a rather long drive shaft 45 which is secured in position by appropriate pillow blocks. The shaft 45 is connected to appropriate bevel gear means at 45a and 45b. A pair of parallel drive screws 46 is supported on the mounting plate 44 by appropriate pillow blocks 46a. Each of the screws 46 is engaged with the bevel gear means 45a and 45b in the illustrated manner for rotation in unison and also in the same direction. Each of the elongate screws 46 translates a traveling nut 47 along the length of the screws as the motor M-4 rotates the shaft 45. The traveling nuts 47 cooperate to impart lateral movement to the table 11 as will be appreciated. Lateral movement in response to the motor M-4 may occur with or without rotational movement imparted through the ring-gear 40 as previously described.

Attention is next directed to the mounting plate 48 which is secured to the traveling nuts 47 by welding or other appropriate means. The motor M-3 is secured relative to the plate 48 by a mounting bracket 48a. The motor M-3 is connected to an elongate threaded screw 49 which is secured in position on the plate 48 by a pair of pillow blocks 48b. The threaded portion is located between the pillow blocks to translate a follower 50 essentially across the full width of the plate 48. A portion of the shaft 49 supports a chain sprocket 49a for driving a link chain 51. The link chain 51 engages a similar sprocket 49b which has the same number of teeth thereon to provide equal rotation of the pair of threaded members as will be noted. The sprocket 49b is mounted on the forward end of an additional threaded member 49' which is similar to the previously described shaft 49 except that shaft 49' is shorter. Likewise, additional pillow blocks 48b align the shaft 49' in a parallel position to impart identical movement to the follower 50 so that the pair of followers track with one another.

Referring again to FIG. 1, the mounting plate 48 is positioned immediately below the table 11 and the followers 50 are joined to the table 11 by welding or other appropriate means. The apparatus carried on the plate 48 provides movement of the table 11 forwardly or rearwardly of the camera stand 10 as viewed in FIG. 1. It will be appreciated that the movement imparted by the motor M-3 is independent of lateral movement resulting from the apparatus carried on the plate 44 or the rotational movement imparted by the motor M-2.

The apparatus described above and shown in FIG. 1A provides compound movements to the table 11. That is to say, rotation, movement of the table 11 laterally of the camera stand, or movement of the table 11 toward or away from the vertical columns 12 is independently provided by the apparatus so that each of the movements may occur independently without regard to one another. Likewise, the movements may occur simultaneously if desired.

FIG. 1A also illustrates the lower side of the table 11 and additional details concerning the movable track 33. In FIG. 1A it will be noted that the table 11 is formed in a number of segments, such as the segments 11a and 11b. Segments are joined together by a reinforcing member 11d which is located at the end of the table as shown in FIG. 1, it being appreciated that a parallel member is likewise provided at the opposite end of the table for the same purpose. The track 33 is positioned between adjacent segments 11a and 11b for sliding movement. Upwardly facing shoulders are formed in the edges of the table segments at 11e for supporting the track 33 in position. This prevents the track 33 from dropping through the slot defined by the adjacent table segments 11a and 11b. The track is rested on the shoulders 11e and is moved to the left or right by means of the motor M-8. The motor M-8 is secured on a mounting bracket (see FIG. 2 for additional details) and drives a rotatable shaft 36. The shaft 36 is connected to a conventional gear 37 which engages the gear teeth 33a on the lower side of the track 33 which comprise a rack converting rotational movement into rectilinear movement. The shaft 36 is secured in position by the means 36e.

The motors M-2 through M-8 are secured to the camera stand 10 by brackets 53 comprised of a vertically extending plate 53b as is illustrated in FIG. 2. FIG. 2 illustrates the motor M (any of the motors M-2 through M-8) connected to the plate 53b by means such as the bolts 54 which extend through mounting ears on the motors and the plate 53 to threadedly engage the nuts 55 to secure the motor M to the mounting bracket 53. Each motor M includes a drive shaft 56 which is extended through an opening in the mounting bracket 53 and which is axially aligned with a rotatable shaft 58 of the camera stand 10. The shaft 58 generically represents the connection with any of the operable or movable parts of the camera stand, and the shaft 58 may be similar or even identical to the shafts illustrated in FIG. 1A. In any event, the shaft 58 carries a coupling 59 on the outer end thereof which is positioned in a spaced relationship with a coupling 60 carried on the motor shaft 56 with the spaced faces of the coupling 59 and 60 bearing radially extending serrations and adapted to engage a hollow rubber coupling member 61 which is placed therebetween. Precise alignment is not required due to the fact that the rubber coupling 61 is yieldable and flexible between the drive couplings 59 and 60 and the coupling means herein provided functions to transfer rotational movement from the motor M to the shaft of the camera stand 10.

A bevel gear 62 is mounted on the shaft 58 by means of a set screw 62a carried in the gear collar and is cooperatively engaged with a mating bevel gear 63 which also has a set screw 63a for mounting purposes. A Veeder Root counter 64 having a rotatable shaft is mounted on the camera stand 10 to indicate the position of the part operated by the shaft 58 and is operated by rotation transferred through the bevel gears 62 ad 63.

Various references of measure are used with the Veeder Root counters associated with each of the motors M with the basic unit of measurement and indication being one hundredth of an inch. The four slidable tracks 33 are each calibrated in terms of inches and hundredths so that the Veeder Root counters associated therewith read directly the location of the tracks. Rotation of the camera stand 10 in response to the motor M-2 is measured by a Veeder Root counter 64 which indicates units of one tenth of one degree of rotation. The motors M-3 and M-4 have associated therewith Veeder Root counters 64 which also indicate linear measurements of one hundredth of an inch to apprise the operator of the translational position of the table 11 of the camera stand 10. A counter 64a is operated by a gear 66 which is chain driven to indicate camera height above the table 11 (FIG. 1).

Three sources of control are shown in the schematic of the control apparatus 20 of this invention which provide a variety of operational techniques. Usually, when art work is initially placed on the camera stand 10, the various movable parts (eight in the preferred embodiment) may be found at any position, perhaps resulting from previous use of the camera stand 10. Initial conditions are customarily in positioning art work and it may be necessary to institute large scale adjustments in setting initial conditions. For this purpose, means are provided in the control apparatus 20 of this invention for rapidly readjusting each movable portion of the machine to some approximate value and means are associated therewith for slowly adjusting the movable portion to achieve a precise setting as indicated by the counter associated with that particular parameter and motor M.

Certain film sequences and animation effects are often so short in length that the preparation of a punched paper tape 16 is considered unnecessary, and of course, for other reasons, it may be desired to operate the control apparatus 20 by means other than the information preprogrammed on tape. For whatever reason, precise movements of the parts of the camera stand 10 may be achieved by semi-automatic operation of means for determining the amplitude of movement, its polarity, and designation of the variable part to be moved. The control apparatus additionally includes means providing completely automatic operation from instructions transferred by a medium such as the punched paper tape 16 illustrated in FIG. 3.

Instructions of whatever nature formed by the control apparatus 20 of this invention are applied to the selected stepping motor M and the desired movement is produced in accordance with the instructions administered to the control apparatus. The motors M provided for operation of the movable parts (motors M-1 through M-8 with the motor 24 shown schematically as the motor M-1) are preferably similar to or identical to those disclosed in Patent No. 2,982,872. The motors are pulse-operated and achieve magnetic balance between the rotor and the field at incremental steps of 1.8 degrees. Current is applied to four leads connected to a pulse generating circuit sold by the same manufacturer and the various pulse routing sequences available with the four leads in the multiple field windings effectively yield two hundred steps or positions per revolution. In any event, the application of a pulse to the translator yields a step of 1.8 degrees of rotation of the shaft of the motor which is transferred from the motor shaft 56 to the shaft 58 of the camera stand 10 (FIG. 2). The motors are bidirectional and reversal is achieved in the translator by applying pulses in reverse sequence to one of the four leads connecting the translator to the selected motor.

Because of certain scale factors in the mechanical linkage of the camera stand 10 and the motors M it has been found desirable to step each of the motors twenty times to result in an indication of one hundredth of an inch or one tenth of a degree as the case may be, at the Veeder Root counters 64 associated with the operated motor. In other words, thirty-six degrees of rotation by the motor produces the smallest unit of movement on the camera stand 10 which is the unit used in preprogrammed animation effects. Therefore, the circuitry of this invention is adapted to supply twenty pulses to each of the motors for an input of one unit measure in an animation technique although, of course, this ratio might be altered to any suitable ratio dependent on the rotational transfer characteristics of the mechanical connective means interposed between the power source such as the motors M and the movable part to be operated.

Considering operation of the circuitry illustrated in the schematic of FIGS. 4A through 4F, such operation should be related to the instructions provided by the punched paper tape 16 illustrated in FIG. 3. The preferred embodiment of this invention utilizes punched paper tape 16 which has a row of sprocket holes indicated generally at 70 and has extending across the width of the tape sufficient space for accepting up to eight punched holes to serve as eight bits of information. Two such rows provide sixteen bits of information which bits are used by this invention to form one instruction to the control apparatus 20 of this invention with the information located as follows: The forwardmost row 16a of perforations observed when the tape advances in the direction of the arrow 71 is encountered by means translating the tape information to electrical signals having eight bits which define the magnitude of the animation operation. Considering the eight locations, the maximum possible deflection is two hundred fifty-five units as dictated by the eight bits wherein the least significant bit provides one unit of deflection and the other bits of information provide two, four, eight, sixteen, thirty-two, sixty-four, and one hundred twenty-eight.

The second row 16b of instructional bits provides information controlling the mode of operation of the camera stand 10. Specifically, the bits of the row 16b may be labeled bits 1 through 8 from the top of the tape 16 shown in FIG. 3 and the top four bits provide motor M selection information 72 which selects one of the motors for actuation in the amount encoded in the column 16a immediately preceding the instructions of the column 16b. The bit 5 position provides polarity information which controls the operation of the bidirectional motor selected by the parameter selection instruction 72. The presence of a perforation in the punched tape 16 at the bit 5 position in the second column of information 16b causes counter-clockwise operation of the selected stepping motor M.

The bit 6 location of the row 16b of each instruction is a programmed inhibit information which stops the tape and operation of the control appartus of this invention at a preprogrammed time. It is sometimes necessary for any one of many reasons to stop operation of the camera stand. One such reason is that the end of a filming sequence has been reached.

Bit 7 information provides a signal which, in the presence of a perforation in the tape 16, operates the shutter release of the camera 14. Film is exposed after operation of the motor M as will be described in more detail.

The bit 8 location of the row 16b is vacant and is reserved for further instructions if desired.

Note should be taken of the origin of the punch paper tape 16. In the production of animation film to date, an animation director writes an animation program in which the camera operator is directed to place various pieces of art work on the table 11, adjust the various operable parts by positioning the art work at designated positions indicated by the counters 64, and then expose the film. The movement between film exposures is determined by the animation director. As a generalization, he is trained to envision acceptable animation in the completed film in terms of the change of position of the art work between photographs. Consider an example of an animation training film in which the animation director desires to depict the flow of liquid in a pipe from a source of liquid. Typically, this may engender the use of the track 33 to move the art work color representing the liquid in movements which do not appear to be jerky or irregular in the completed film. In this circumstance, the art work representing the fluid conduit is placed on the table 11 and secured thereto. The art work representing the flowing liquid is connected to the track 33. The program director calls on his experience and training to direct the camera man to move the art work between pre-determined positions for each exposure of the film in the camera, and this process is repeated for each frame of film exposed.

From the foregoing, it will be appreciated that an animation program is derived from the animation director in the form of a number of instructions to the camera man. The device of the present invention utilizes punch paper tape 16 or other suitable medium in which the moves for the art work are encoded in the perforations in the row 16a shown in FIG. 3. Additionally, the row 16b provides information selecting the movable part of the camera stand 10, its polarity of movement, and the other information noted above. The paper tape 16 is best described as encoding the instructions of the animation director.

The tape reader 18 is a conventional tape transport mechanism which positions the row 16a of an instruction beneath a plurality of contacts with the plurality of contacts communicating through the perforations formed in the tape 16 to sense the holes and form signals related to the presence or absence of the perforations. More specifically, the presence of a perforation is sensed by completion of a circuit which forms an electrical signal which will be described hereinafter as a "one" level signal as opposed to a "zero" level signal which are the only symbols of binary representation. A plurality of conductors 75 transfers the eight binary signals detected from the row 16a from the tape reader 18 to two sets of input gates with one set of gates 80 being arranged to enter the informations in parallel fashion into a register. More particularly an AND gate 80–1 is connected to the conductor 75–1 and so on for all of the AND gates up to gate 80–8. A one signal is applied to a storage gate by the conductor 76 which is connected as a second input for each of the gates 80 to thereby enable operation of the gates to transfer the signals from the row 16a conducted by the conductors 75 to the counter illustrated in FIG. 4D through a plurality of conductors 81–1 through 81–8. As will be apparent to those skilled in the art, each of the gates 80 operates on occurrence of a one level signal at all inputs to the gate to form a signal which is transferred by the conductor 81 connected thereto when the tape reader 18 reads a one level signal at the appropriate position on the tape 16. Conversely, the absence of a perforation in the tape 16 transmits a zero signal through the conductors 75 and the AND gate connected thereto does not operate and forms no signal which is transferred as information.

The counter of FIG. 4D receives the information from the gates 80 through the parallel conductors 81 and the presence of a one signal on any one of the conductors 81 operates the bistable storage elements 82 to store the information therein. A conductor 83 is connected to a plurality of pulse AND gates 84 connected in communication with each of the bistable storage means 82. The absence of a one level signal on the conductor 83 isolates the bistable flip-flops 82 from adjacent flip-flops of the storage register 82 and when a one-level signal is carried by the conductor 83, the pulse AND gates 84 are enabled to form a cascaded chain of bistable elements with the least significant bit of data stored in the least significant flip-flop 82–1 of the storage register.

A conductor 86 is an input for a count diminish signal which includes a plurality of consecutive pulses for the storage register having connections which alter the register and the means for communicating the bits in parallel fashion to the binary counter which is then connected to receive a serial input from the conductor 86. The conductor 86 is connected to the trigger input lead of the flip-flop 82–1, and the pulses reverse the state of the flip-flop on every pulse. As is understood by those skilled in the art, the counting of the flip-flop 82–1 is connected through the pulse AND gate 84–1 to the flip-flop 82–2 and on up the chain of cascaded means for diminishing the value registered therein. It is to be noted that the output of each of the flip-flops 82 is connected to the pulse AND gate 84 communicating it with the next most significant storage element by way of the gate terminal marked P in FIG. 4D. Thus, when the counter gates inhibit signal is removed from the conductor 83, the transferring a false signal on removal of the inhibit is eliminated because the removal of the inhibit signal readies the number entry means without an A-C signal on the pulse terminals. When the count diminish signal is applied to the conductor 86 and counting begins, the pulse AND gates 84 transfer carry signals on occurrence of the leading edge of pulses applied thereto so that counting in a conventional manner is possible after the counter gates inhibit signal is removed.

The count diminish signal operates the binary counter to decrementally diminish the number entered into the storage register to decrementally reset the counter to the zero state on completion of the countdown. The reset state is recognized by connecting a plurality of conductors 88 to each of the storage elements 82 at the zero output terminals thereof with all the conductors 88 communicated with an AND gate 90. The gate 90 recognizes the presence of a nonzero number in the binary counter and signifies the presence of a nonzero value in the binary counter by forming a zero level output signal in the conductor 91; conversely, the AND gate 90 recognizes the reset condition of the binary counter and forms a one level signal in the conductor 91 which is defined as a signal Z signifying the end of count. Additionally, an INVERTER 92 is connected to the conductor 91 and provides a signal inverse of Z ($\bar{Z}$) in the conductor 118.

To avoid losing sight of the overall operation of the control apparatus 20 of this invention, it should be borne in mind that the device controls operation of a stepping motor in accordance with a preprogrammed instruction and the invention provides means proportioning operation of the signal responsive means such as the motor 24 to the amplitude of the desired operation. A consideration of the operation of the invention as a whole and utilization of the information transferred from the row 16a by the tape reader 18 into the storage register 82 is further understood by viewing FIG. 4A to consider operation of the circuitry for reading the information on the row 16b. The tape reader 18 is operated to advance the tape (as will be explained hereinafter) and the conductors 75 communicate the means for sensing and forming the signals to other portions of the circuitry. As mentioned hereinbefore, the first four bits 72 (FIG. 3) and the additional bits provide movable part selection information and other information and the instructions are connected to a plurality of AND gates 96 which operate on a time-sharing basis with the transferring means 80 having similar connections with the conductors 75. The conductors 75 are communicated with the gates 96 and bit 1 of the motor selection information 72 is communicated through an AND gate 96-1, and the other AND gates have sequential designations. The motor selection instruction 72 is transferred to a plurality of bistable storage elements 97-1, 97-2, 97-3 and 97-4.

The storage elements 97 are switched to conductive states to reproduce the encoded motor selection instruction 72 in a plurality of conductors 98 which are connected to the storage elements 97. A conductor 98-1 is connected to the one level of the storage element 97-1, and the zero level output of that storage element is connected to a conductor 98-2. Further, elements 97-2, 97-3, and 97-4 are additionally connected to conductors 98-3 through 98-8 in sequence. The four storage elements 97 provide a maximum possible fifteen combinations differing from the reset state of the group considered as a whole and each of the operable elements of the camera stand 10 is provided with one of the possible encoded combinations which is sensed by an individual AND gate 99 connected to the conductors 98. Specifically, the AND gates 99 include eight AND gates connected to separate combinations of the conductors 98 as a means of selecting the motor M to be operated and two additional AND gates are included to operate other parts of the camera stand. Each of the AND gates 99 is connected to a relay driver 100 to operate the functions encoded in the part selection information 72. Considering one of the AND gates 99 and the driver relay 100 connected thereto, the AND gate 99-1 is connected to conductors 98-1, 98-4, 98-6 and 98-8. When a one level signal is placed on the four conductors, the AND gate 99-1 recognizes the coded combination formed by the storage elements 97 and operates to form a one level output signal which is connected to the relay driver 100-1 having an output conductor 101-1. In addition, the AND gate 98-10 operates the relay driver 100-10 and the conductor 101-10 which extends to the camera 14 to reverse operation of the camera. Also, the conductor 101-9 is connected to the camera to provide the photographic function of the camera.

Selection of a signal responsive means is completed by application of the signal formed in the plurality of conductors 101 of FIG. 4B to a plurality of motor relays indicated generally at 105 in FIG. 4E. A translator 106 provides a plurality of output pulses over four conductors indicated generally at 107 which are connected to a selection relay bus 108 communication with the relays indicated generally at 105. Selection of a particular motor by a signal in one of the plurality of conductors 101 operates a motor relay to energize the selected motor through conductive means indicated generally at 109 communicating the selection relay bus 108 to the relays 105 and the conduction means 110 communicating the relays 105 with the signal responsive means of this invention. A relay operative voltage of twenty-four volts is applied through a line 111 communicating with each of the relays 105 as a means of supplying power to the windings of the relays. Choosing operation of one of the relays as an example, the output of the translator 106 is applied to the bus 108, the conductors indicated at 109-5, the track 1 selection relay 105-5, the conductors 110-5 and the motor M-5. Each individual conductor of the conductors 109 and 110 is identified by use of the same suffix associated with the reference designator of the particular relay in question.

Each of the relay drivers 100 is connected through a switch 103 for reasons to be explained hereinafter. Also, the selection recognition gates 99-5 through 99-8 provide output signals through a conductor 102-5 through 102-8 for reasons to be described.

Relating the selection of a variable movable part of the mechanism to be operated to the extent of operation (information in row 16a) the motor selection information 72 on the row 16b of the tape 16 operates the invention as described hereinabove to energize one of the relays 105 to connect the translator 106 to appropriate signal responsive means. The instruction of row 16a is placed in the storage register 82 and the instruction magnitude is decrementally diminished to reset each of the cascaded elements of the storage register to zero with the counting in the storage register related to the operation of the selected movable part of the camera stand 10. In other words, the translator 106 is energized and operates a stepping motor only so long as the counting process continues in the storage register 82. Any nonzero number in the storage register 82 causes a zero output of the storage register gate 90 so that the $\bar{Z}$ signal provided by the INVERTER 92 is a one level signal carried by the conductor 118 which is one of three inputs for a clock AND gate 120 shown in FIG. 4E. A clock 121 provides an additional input and a tape advance inhibit signal is connected by a wire 122 to the AND gate 120. The clock 121 runs at all times, but the removal of the inhibit signal on the conductor 122 controls the output of clock pulses from the clock AND gate on the conductor 124. A frequency scaler 125 including a flip-flop 125a, a ten millisecond single shot relay circuit 125b, and a decade divider 125d provides one output pulse for every twenty input pulses from the clock AND gate 120 and is connected to the conductor 86 to provide the diminish counts for the binary counter 82. The delay provided by the single shot 125b delays the $\bar{Z}$ signal to hold the clock gate on for sufficient time for the last clock pulse to operate the translator 106.

In correlating operation of the countdown in the binary counter 82 with the operation of a particular stepping motor as selected by the circuitry of FIG. 4B, it is appropriate at this point to consider the information provided at the bit 5 location of the row 16b on the tape 16 which denotes the direction of operation of the device designated by the parameter selection instruction 72. A conductor 128 communicates with the AND gate 96-5 to obtain the bit 5 information and the signal is conducted by the conductor 128 to an AND gate 130. Additionally, the conductor 128 communicates with an INVERTER 131 which has an output connected to an AND gate 132. A conductor 127 from the clock AND gate 120 is connected to each of the AND gates 130 and 132 which cooperate together to provide an output designating clockwise or counterclockwise rotation for the selected stepping motor. A one level signal generated in response to a perforation at the bit 5 location on the tape 16 enables the AND gate 130 to provide an output of clock pulses from the conductor 127 in the output conductor 134. The conductor 134 is connected to an INVERTER 135 which provides an input for the translator 106 to operate same to provide counterclockwise rotation of the selected D-C stepping motor by communicating pulses through the conductors indicated generally at 107. On the other hand, a conductor 136 carries clock pulses from the gate 132 to the INVERTER 131 forming an input to an INVERTER 137 which is connected to the translator 106 to provide clock pulses triggering rotation in the clockwise direction of the D-C stepping motors connected through the selection relay bus 108 and the operated relay of the relay bank 105.

The completion of stepping of one of the motors M terminates the utility of the information contained in each instruction on the tape 16. Sometimes, more than one movable part is operated to adjust the art work on the table 11 before a frame of film is exposed in the camera 14. In other animation sequences, the film is exposed at the end of each instruction because only one part need be operated to provide the desired animation effect. In either event, the apparatus of this invention provides means signifying the end of count which means are utilized to release the shutter of the camera 14 if the shutter release bit is encoded in the tape 16 and for advancing the tape by operation of the tape reader 18 to the next row of instructions. A conductor 145 in FIG. 4C is connected to the AND gate 96–7 and an INVERTER 146 is communicated to the conductor 145 for receiving the bit 7 information provided by the tape reader 18. The absence of a perforation in the bit 7 position on the tape 16 forms a zero signal which is inverted by the INVERTER 146 to an output of one which is connected to an AND gate 148. Upon the completion of the count in the storage register 82 which returns all of the bistable storage elements to the reset state which is sensed by the storage register AND gate 90, a one signal communicated to the conductor 91 is transferred by the conductor 91 illustrated in FIG. 4C which is input to the AND gate 148. Since the bit 7 position designates occurrence of a shutter release, if no shutter release is programmed into the instructions, the signal output by the gate 90 is enabled through the gate 148 by the output of the INVERTER 146 to an OR gate 150. The OR gate provides an output signal to additional circuitry which will be described in more detail for stepping the tape advance mechanism in the tape recorder 18 and further resetting various portions of the circuitry such as the gates connected to the tape reader in FIG. 4A. If the instruction should include a perforation at the bit 7 position resulting in the formation of a one level signal in the conductor 145, the output of the INVERTER 146 becomes zero and the gate 148 will not pass the count termination signal provided by the conductor 91. However, the count termination signal on the conductor 91 is conducted to circuitry incorporating means for operating the shutter release mechanism of the camera 14 before generation of signals for advancing the tape in the tape reader 18.

A shutter release gate 155 is provided with a plurality of inputs and on the occurrence of one signal at all the inputs signifies appropriate timing for release of the shutter of the camera 14. The conductor 145 is connected to the gate 155 and provides a one level signal when the tape 16 includes a perforation at the bit 7 position on the second row 16b. Additionally, the conductor 91 is also connected as an input to the gate 155 to signify the end of count achieved in the storage register 82 so that release of the shutter of the camera 14 is withheld during movement of any of the stepping motors which movement might tend to blur the exposed frame of film when the art work is photographed.

A switch 156 is provided for manual inhibit of operations should the operator of the control apparatus of this invention desire to withhold release of the shutter mechanism. The switch 156 provides a connection to either conductor 157 or conductor 159 which communicate with voltage sources providing voltages at the one and zero levels respectively for the logic circuitry. The camera stand 10 includes a platen (not shown) which is adapted to be positioned over the art work placed on the table 11 to hold the art work firmly against the table in a precisely positioned plane perpendicular to the axis of the photographic field of the camera 14. If the platen should be raised for any reason during the exposure of the frame of film of the camera 14, the platen interferes with the photographic scene and may ruin the exposure. Therefore, a platen switch 158 is also connected to the conductors 157 and 159. The conductors 102–5 through 102–8 are connected to an OR gate 160a which forms an input for an INVERTER 160b. The inverter drives a single shot multivibrator 160d which forms an output signal which is input to the gate 155. The gate 160a also provides an input for a relay driver 160e connected to operate a relay 160f which applies current to a platen lift solenoid 160g. When any of the track motors is operated, the gate 160a forms a signal which causes operation of the solenoid 160g to lift the platen from contact with the art work on camera table 11 to avoid tearing the art work. The platen is lowered after expiration of the output pulse of the OR gate 160a and the single shot 160d operates the gate 155 after time delay to permit the platen to be repositioned on the table 11.

A sixth input to the AND gate is derived from the bit 6 information which is a programmed inhibit. As mentioned hereinbefore, it is sometimes desirble to inhibit operation of the equipment to alter the art work or for other reasons and such information is sensed by the tape reader 18 and communicated through the gate 96–6 to a conductor 160 which provides an input to a flip-flop 161. The presence of a perforation in the bit 6 position on the tape 16 generates a one level signal which operates the flip-flop 161 to form a zero signal in the conductor 162 which is an input for the shutter release gate 155. The zero signal remains on the conductor 162 to thereby inhibit operation of the shutter release mechanism of the camera 14 until such signal is removed. A conductor 163 communicates with a voltage source providing a one level signal through a push button switch 164 which is connected to the reset input of the flip-flop 161 to restore the one level signal to the conductor 162 communicating with the gate 155. Thus, if the manual inhibit switch is not operated, if the platen is in place on the art work, if the instruction on the tape 16 does not include a programmed inhibit at the bit 6 position, then a perforation at the bit 7 position will release the shutter of the camera 14 on completion of the count in the storage register 82 as signified by a one level signal transmitted by the conductor 91 to the storage gate 155.

The output of the shutter release gate 155 is connected to a single shot multivibrator 170 which provides a pulse of the appropriate length to a relay driver 171 which is connected by a conductor 172 to the shutter release mechanism 14a of the camera 14. Additionally, a conductor 175 is connected from the gate 155 to the OR gate 150 and provides an input signifying termination of the count in the storage register 82 accompanied by a shutter release construction in the bit 7 position of the row 16b on the tape 16. The gate 150 functions on occurrence of either the completion of the countdown in the storage register 82 connected through the INVERTER 146 and the AND gate 148 or functions in response to the shutter relase gate 155 which provides a signal signifying actuation of the shutter release mechanism 14a.

The output of the OR gate 150 is connected to a conductor 177 to operate additional means in FIG. 4C for stepping the tape reader mechanism 18 to advance the next adjacent row of instructions on the tape 16 to a position to be read. Relating operation of the circuitry of FIG. 4C to the timing chart illustrated in FIG. 5, the conductor 177 is connected as an input to a single shot multivibrator 180 which forms an output pulse 300 milliseconds in length. In the quiescent state, the single shot 180 provides a zero output at the one terminal which is connected to a conductor 181 by way of a conductor 186 and an INVERTER 187 which forms a one input for a tape advance AND gate 182, and the conductor 181 also communicates with a 100 millisecond single shot multivibrator 183 to add 100 milliseconds of pulse stretching to the signal provided by the multivibrator 180. The tape advance gate 182 senses the quiescent one level signal maintained by the multivibrator 180 and couples the signal through the output conductor 122 which communicates with the clock gate 120 in FIG. 4E. Thus, the quiescent condition of the single shot 180 provides a one level signal to the clock gate 120 to enable the clock gate for counting purposes. However, as mentioned hereinabove, the clock gate 120 does not operate until the Z̄ signal in the conductor 118 is supplied by the INVERTER 92 from the binary counter gate 90 signifying the presence of a number in the binary counter 82 that has a nonzero, integer value. When the single shot 180 operates for 300 milliseconds, it places a zero at the zero output terminal and the AND gate 182 provides an output signal of zero also. Further, the multivibrator 183 stretches the pulse to 400 milliseconds to thereby withhold operation of the clock gate 120 before counting starts in the storage register 82 to afford extra time for operation of the motor selection relays 105 in response to the parameter selection information 72 operating through the circuitry of FIG. 4B.

Operation of the multivibrator 180 in response to a signal in the conductor 177 forms a 300 millisecond one level in a conductor 186 which is connected to an INVERTER 187 which provides a 300 millisecond zero level output signal. One output of the INVERTER 187 is connected to a conductor 83 shown on FIG. 4D which is connected to the pulse AND gates 84 so that the zero level signal on the gates 84 isolates the bistable storage elements of the counter so that each element may receive from the parallel inputs 81 the instruction punched on the row 16a of the tape 16. Further, the INVERTER 187 has an output conducted over a wire 189 which is communicated by the wire 189 in FIG. 4A to the plurality of AND gates 96 communicating with the conductors 75 to enable the gates 96 to function on a time sharing basis with the gates 80 relative to the mutually interlaced output signals on the conductors 75 from the means for sensing the presence of perforations in the tape 16.

Operation of the multivibrator 180 is represented by the wave form 192 of FIG. 5 which is the uppermost illustrated wave form. Also, the counter gates inhibit signal placed on the conductor 83 which operates the means for serially communicating the elements of the register 82 of FIG. 4D in the wave form illustrated at 193 of FIG. 5. It may be appreciated that the gates inhibit signal placed on the conductor 189 and connected to the gates 96 of FIG. 4A has a similar wave form.

The conductor 177 is connected to a single shot multivibrator 195 which forms a pulse of 4.5 milliseconds duration which is connected through a conductor 196 to a relay driver 197 to operate the tape advance solenoid 198 represented schematically in FIG. 4C which is located in the tape reader 18. The pulse in the conductor 196 is illustrated in FIG. 5 as the wave form 199 and is of sufficient duration to advance the tape 16 relative to the tape reader from one row to the next. In the preferred embodiment, the tape reader utilizes advance of one tenth of an inch and the rows of perforations are formed at intervals of one tenth of an inch. The first tape advance positions the row 16a beneath the means for forming electrical levels representing the magnitude of operation instruction communicated to the counter of FIG. 4D.

The first row of perforations 16a is read sometime after completion of the operation of the first tape advance which is represented on the timing chart of FIG. 5 as the wave form 199. To avoid jitter and to allow the tape reader 18 time to position the sensors relative to the row of perforations 16a, reading is delayed by operation of a single shot multivibrator 220. The multivibrator 200 is triggered by the output pulse of the OR gate 150 connected by the conductor 177 to the multivibrator 200. The output of the multivibrator 200 is inverted by an INVERTER 201 and input to a similar single shot multivibrator 202. Multivibrators 200 and 202 provide an output pulse of 100 milliseconds each. The output of the multivibrator 200 is illustrated in FIG. 5 as wave form 203 which provides 100 milliseconds delay before the first row 16a of the tape is read by the tape reader 18 as will be described.

The output of the multivibrator 202 is connected by a conductor 206 through an AND gate 207 which has an additional input from the 300 millisecond single shot millivibrator 180 operating through a conductor 186. The AND gate 207, on receipt of one level signals from both multivibrators 180 and 202, operates to form a one level signal which is connected by the conductor 76 communicating with the storage gates 80 illustrated in FIG. 4A. The signal enables the storage gates to function at an appropriate time while receiving all the signals in the plurality of conductors 75 as inputs to transfer the correct information from the tape reader 18 to the storage register 82 illustrated in FIG. 4D after occurrence of the 100 millisecond delay illustrated in FIG. 5 as wave form 203. The delay assures clean signals and avoids the initial jitter occurring when the sensors of the tape reader 18 encounter the perforations of the row 16a on the tape 16. The storage gates enable signal is illustrated in FIG. 5 as the wave form 208.

The gate 207 provides an output over a conductor 210 which is communicated to FIG. 4B to each of the motor selection logic elements 97 to reset the four elements of that circuit before the tape reader 18 reads the motor selection data 72 on the second row 16b. Operation to the reset state of the motor selection logic 97 returns all the selection recognition gates 99 to zero level output signals. The logical decision register reset pulse is illustrated in FIG. 5 as the wave form 212.

After operation of the multivibrator 202 for 100 milliseconds which is delayed by 100 milliseconds after the initiation of operation of the multivibrator 180, the instructions coded into the row 16a of the tape 16 are received during the pulse 208 and stored in the counter 82 of FIG. 4D, the control apparatus 20 of this invention is prepared to receive the information of the second row 16b. Such information is taken from the second row by advancing the tape reader 18 to read the second row through operation of an INVERTER 215 sensing the output of the output of the single shot 202 which provides a delayed input for the multivibrator 195 resulting from a single shot delay of 10 milliseconds connected thereto by a conductor 216. The single shot 195 is triggered a second time which fact is illustrated in FIG. 5 to provide a 4.5 millisecond tape advance signal which is wave form 218 and the pulse is displaced 10 milliseconds to permit the signals output by the gate 207 to operate the circuits to which they are applied. On advancing, the tape positions the sensors of the tape reader 18 in the perforations of the row 16b and signals are formed in the conductors 75 representative thereof. The plurality of gates indicated at 96 is held in the nonconducting state by the signal output of the INVERTER 187 which is similar to wave form 193. The signals are held in the conductors 75 as long as the tape reader does not advance past the row 16b, and upon expiration of the 300 millisecond operation of the multivibrator 180, a one level signal in the conductor 189 enables the gates 96 to operate to transfer the seven bits of information received from the row 16b of the tape. Such information is transferred to the various portions of circuitry illustrated in the drawings and such circuitry is prepared for counting in actuation of the selected motor.

The circuitry of FIG. 4B operates to select one of the motors through the selection recognition gates 99, relay drivers 100, and relays 105 illustrated on FIG. 4E. The selected motor is placed in communication with the selection relay bus 108 communicating the motor with the translator 106. Before the 100 milliseconds pulse stretching provided by the single shot multivibrator 183 terminates, the tape advance gate 182 withholds an output for the conductor 122 to provide a one level signal for the clock gate 120 illustrated on FIG. 4E to enable the clock 121 to conduct pulses through the conductors 124 and 127. After the 100 milliseconds pulse stretching, the frequency scaler 125 is supplied with clock pulses and furnishes count diminish pulse through the conductor 86 to the storage register 82 illustrated in FIG. 4D to begin countdown. Also, the conductor 127 operates through the AND gates 130 and 132 to furnish signals to the translator 196 driving it in the chosen clockwise or counterclockwise direction as dictated by the information from the bit 5 position on the second row of instructions 16b. Counting continues as described hereinabove and the circuitry illustrated in FIG. 4C utilizes the information from the bit 6 and bit 7 positions of the tape to achieve the shutter release if desired or the programmed inhibit if present. Upon completion of all the sequences relating to the shutter release gate 155 and the OR gate 159, the apparatus is ready to repeat the cycle through operation of the signal applied over the conductor 177 as described hereinabove and the generation of the wave forms of FIG. 5 automatically.

As mentioned hereinbefore, the control apparatus of this invention provides automatic operation in response to preprogrammed instructions punched in the tape 16 and additionally provides control means for setting initial conditions of each operable part and also has means for semiautomatic operation. The hand switch 250 shown in FIG. 4F is provided for selection of a plurality of contacts 250-1 through 250-8. Each of the contacts 250-1 through 250-8 is connected by one of a plurality of conductors 252 to the conductors 101-1 through 101-8, respectively, illustrated in FIG. 4D. The conductors 252 supply ground for one of the relays 105 to thereby connect the selection relay but 108 with one of the signal responsive means and communicating same with the translator 106. The switches 103 are operated to disconnect the relay drivers 100 from the conductors 101 and manual motor selection is provided by the switch 250.

The selected parameter chosen by operation of the switch 250 is operated to a chosen position by actuation of one of two switches 254 or 256. Each of the switches 254 and 256 is supplied by clock pulses from a free running multivibrator 258 and the switch 254 is connected by means of a conductor 259 to an OR gate 260. The OR gate provides an output in a conductor 261 which extends from FIG. 4F to the INVERTER 135 illustrated in FIG. 4E as a second input to INVERTER 135 for driving the translator 106. Also, the switch 256 is connected by means of a conductor 262 to an OR gate 263 which is communicated by means of a conductor 264 to the INVERTER 137 illustrated on FIG. 4E. It may be appreciated that application of a signal through either conductor 261 or conductor 264 and an INVERTER operates the translator 106 to provide pulses operating the selected signal responsive means energized by connection through the relay bank 105.

The switches 254 and 256 on actuation, provide connection to the conductors 259 and 262, respectively, and on further actuation, mechanically actuate an additional switch 267 which disconnects a capacitor 268 to the multivibrator 258 to alter the pulse repetition rate of the clock pulses output by the multivibrator, Thus, an actuation of either of the switches 254 or 256 provides a slow rate of clock pulses and further actuation provides pulses at a greater frequency to operate the signal responsive means more rapidly so that the movable part of the machine 10 may be rapidly slewed around to approximately the desired location at which time the multivibrator 258 is returned to the slower pulse repetition rate to enable precise setting of initial conditions of the art work positioned on the camera stand table 11.

Semiautomatic operation of the control apparatus 20 of this invention is provided by means of the circuitry illustrated in FIG. 4F utilizing the switch 250 to select one of the variable parameters of the camera stand 10 and to step the signal responsive means by increments to the desired level which is punched in as will be described. A matrix of binary elements indicated generally at 275 includes a plurality of switches for storing instruction bits which are depressed or otherwise actuated to yield a total number of increments of operation for a selected stepping motor in accordance with the instruction. More specifically, the matrix 275 includes switches providing powers of two so that the switch 275-6 provides thirty-two increments of operation, the switch 275-4 provides eight increments of operation, and so on. Of course, the invention is susceptible of additional switches and stages of operation as will be understood more in detail so that larger numbers may be entered in parallel fashion to enable high speed semiautomatic operation of the device of this invention.

Each of the switches 275 is operable to select one of the two output terminals of a counter 280 formed to select one of the two output terminals of a counter 280 formed of a plurality of binary storage elements. Specifically, the counter 280 includes in the preferred embodiment a flip-flop 280-1 having two output terminals communicating with the switch 275-1 of the switching matrix 275 and all other elements of the counter 280 are associated with one of the switches of the matrix 275. The bistable elements of the matrix 275 are actuated to a desired position with instruction bits entered therein in parallel fashion and in ascending order of significance prior to operation of the binary counter 280. A series of pulses is applied to the binary counter element 280-1 having a serial input and being connected to reverse the conductive states of the cascaded elements. The counter 280 counts up until coincidence is achieved between the count in the counter 280 and the instruction bits stored in the bistable elements of the matrix 275 which is recognized to terminate counting.

Counting in the circuit of FIG. 4F is achieved in response to pulses from a clock source 284 with one output in a conductor 285 and the inverse of the output supplied to an additional conductor 287. The conductor 285 is connected to an AND gate 288 and (assuming a one signal in the other input of the gate) the clock pulses from the clock 284 are transferred through the AND gate 288 to a conductor 289. The conductor 289 communicates the pulses with a frequency scaler 290 which pro-rates the pulses fed to the binary counter 280 to achieve the twenty-to-one relationship existing between the smallest increment of movement in the signal responsive means and the smallest increment of measure of the camera stand 10 which in the preferred embodiment is 1.8 degrees of rotation and one hundredth of an inch translation. The output of the scaler 290 is connected to the least significant element 280-1 of the binary counter 280 to generate the counting pulses in the counter and counting is transferred significantly up to each of the elements 280 and communicated with the matrix 275 by the plurality of conductors identified generally at 292. The counting process continues until coincidence is achieved between the instruction stored in the parallel elements of the matrix 275 and the count in the binary counter 280 at which occurrence the switches of the matrix communicate through a plurality of conductors 293 to a coincidence AND gate 299. The gate 299 recognizes coincidence of the counts in the two registers of cooperating bistable elements and forms a one level signal in the output conductor 300 and, conversely, forms a zero level signal in the conductor on occurrence of noncoincidence between the counts in the registers.

Operation of the circuitry illustrated in FIG. 4F of the drawings is controlled by a run switch 301 which, when actuated, is connected to a one level voltage source and communicated to the reset input of a bistable flip-flop 302. The reset terminal is connected through a resistor 303 to a zero level voltage signal which maintains the zero voltage at the input terminal when the run switch 201 is not actuated. The flip-flop 302 is operated by the run switch 301 to place a one level signal at the one output which is communicated by means of a conductor 304 with the AND gate 288. The gate 288, as previously mentioned, controls the transfer of the clock pulses from the clock 284 to the frequency scaler 290 to begin counting. In accordance with the operation of the automatic means provided for execution of instructions in response to the tape 16 through the circuitry illustrated in the drawings, counting proceeds in the circuitry to proportion the time of operation of the signal responsive means to the signal source 106.

Operation of the stepping motor selected by the switch 250 coincident with the counting process and dependent thereon is achieved by connecting the output of the gate 288 through a conductor 307 to an AND gate 308. The AND gate 308 is triggered by a signal derived from the frequency scaler 290 through a conductor 309 connected to a single shot multivibrator 311 which stretches the pulses applied thereto and applies the stretched output to a flip-flop 312. The output of the flip-flop 312 is connected by a conductor 314 to the AND gate 308 and the one level signal is held on the conductor 314 to pass the clock pulses in the conductor 307 through the AND gate 308 as long as the binary counter 280 counts. The pulse stretching of the single shot multivibrator 311 holds the AND gate 308 up for a time somewhat longer than necessary to allow all clock pulses from the signal source 284 to arrive at the translator. The means communicating the pulses from the signal source 284 to the signal responsive means is halted in operation when the gate 299 recognizes coincidence between the binary coded instructions in the matrix 275 and the count in the binary counter 280 by connecting the output one level signal to the conductor 300 and to an AND gate 325. The gate 325 has a pulse input terminal connected to the conductor 287 which applies the inverse of the clock signal from the signal source 284 to the gate 325 which is triggered by the positive going slope of the leading edge of the inverse of the clock signal to provide an output signal through a conductor 326 to the set terminal of the flip-flop 302 to operate the flip-flop to form a zero at the one output terminal which is conducted by the wire 304 to the gate 288 to disconnect the clock pulses from the source 284 from the signal responsive means communicated by the wires 289 and 307.

Termination of the clock pulses permitted through the gate 288 halts the train of pulses output by the AND gate 308 which is communicated to the translator as will be explained and additionally halts the counting in the binary counter 280. When the one output of the flip-flop 302 goes to the zero state, the zero output moves to the one state and forms a signal in a conductor 328 which is connected to an AND gate 333 which has an additional input from the conductor 285 connected to the signal source or clock 284. The pulse output from the clock 284 is connected to a "pulse" input of the gate 326 which triggers on the A-C portion of the clock pulses and creates a reset pulse in a conductor 334 applied to the flip-flop 312 and the set terminals of the flip-flops 280 of the binary counter chain 280. The reset pulse applied to the binary storage elements resets each of the elements preparatory to another instruction. Also, the formation of a one level signal at the zero output terminal of the flip-flop 302 is conducted by a wire 337 to a relay driver 338 which operates an indicator bulb 339 to form a visible indication to the operator of the apparatus that the counting in the binary counter 280 has been completed and coincidence has been achieved between the mechanical register 275 and the binary counter 280.

The chain of pulses provided by the signal source 284 and conducted through the AND gate 288 operates the gate 308 to form output pulses in a conductor 345 which connects to two AND gates 346 and 347. The polarity of operation of the motor selected by the switch 250 and driven during operation of the countdown in the register 280 is ascertained by application of a one level voltage signal to either of the gates 346 or 347 through a pair of ganged switches 348 or 349 connected as inputs to the gates 346 and 347, respectively. Each of the switches is connected to voltage sources providing zero and one signals with the one level voltage signal selecting rotation in the clockwise or counterclockwise direction as the operator may choose.

If, for instance, the switch 348 is operated, the pulses from the gate 308 are transferred by the gate 346 to a conductor 351 which is a second input for the OR gate 260 which communicates by way of conductor 261 and operates the INVERTER 135 of FIG. 4E to drive the translator 106 in the clockwise direction. On the other hand, operation of switch 349 and the AND gate 347 transfers the pulses through a conductor 353 to the OR gate 263 which transfers the pulses in the conductor 264 to the INVERTER 137 illustrated in FIG. 4E and operates the translator 106 to produce counterclockwise rotation of the selected signal responsive means.

From the foregoing, operation of the various portions of the circuitry of this invention has been explained relative to the various subsections of the circuitry in an overall manner to described the invention. Actual operation of the invention may be in accordance with the foregoing and, of course, certain alterations may be incorporated with the invention for various embodiments. For instance, it may be desirable to utilize an information medium such as punched cards, magnetic cores or the like, instead of the punched paper tape 16 illustrated in FIG. 3. Also, the invention may be further altered by utilizing instructions encoded in binary-coded-decimal format on a medium with all bits placed parallel to one another so that it is not necessary to receive and detect the bits of each instruction in portions. As an example, the tape reader 18 might well be equipped with sixteen or more means for sensing the instructions and means for forming voltages representative thereof. As another alternative, the tape reader 18 may be altered to operate with a plurality of reading stations to read blocks of information such as providing simultaneous reading of the rows 16a and 16b as opposed to the sequential reading of the preferred embodiment. Operation with binary-coded-decimal format would require utilization of storage registers adapted to count by decades as opposed to the binary counting now present.

The relationship of twenty-to-one existing between the minimum operating movements of the stepping motors selected for utilization in the preferred embodiment and the minimum measurable distance indicated by the Veeder Root counters 64 of the camera stand 10 may be altered in other applications so that it may not be necessary to include the frequency scalers providing an output of one pulse for every twenty input pulses. Also, the invention utilizes three modes of control described hereinabove as automatic preprogrammed operation, semiautomatic operation or manual operation for achieving initial conditions in the equipment. In various applications it may be desirable to utilize only one or perhaps two of these methods of operation and therefore the apparatus of this invention might be simplified in accordance with such desires.

Semiautomatic operation of this invention is further enhanced by including circuitry illustrated in FIG. 4F wherein a switch 368 is connected to the conductor 337 and applies the one level pulse generated by the flip-flop 302 on occurrence of coincidence as sensed by the gate 299 as an input pulse to a single shot multivibrator 369 which provides an output pulse to a relay driver 370. The relay driver 370 is connected to a relay 371 to operate same and the relay 371 is adaptable to interconnect an additional switching matrix identical to the matrix 275 between the binary counter 280 and the coincidence gate 299. Thus, if it is desired in semiautomatic operation, repetitive actuation or operation for the selected operable part is possible using the relay 371 which is adapted to be connected to a rotary switch to select among identical sets of bistable elements preferably similar to or identical to the switches of the matrix 275. Also, the relay 371 might be used in like manner to select identical selection switches 250 and is likewise operated to select identical polarity switches 348 and 349. Then on occurrence of the end of count signal formed by the coincidence recognizing means of the circuitry of FIG. 4F, the signal generated by the flip-flop 302 is connected through the relay driver 370 to operate the relay 371 to switch into connection another set of switches which may be appropriately preset to avoid impeding operation.

It is to be noted that the invention functions without the use of any feedback loops or signal nulling means. Also, error is noncumulative as the motors M have the same amount of error whether operated for one step or 255 steps. The nonaccumulation of errors allows a filming sequence to be interrupted, the table operated to some other position and returned with no deviation in the position of the art work.

While many changes in the apparatus may be incorporated, one or two will be noted as exemplary. The three means shown in FIG. 1A providing movement to the table 11 may be arranged differently. For instance, the rotational means may be placed above the means providing translational movement instead of below as illustrated. Also, NOR logic can be used alternatively to the OR and AND logic shown.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:
1. Animated film apparatus, comprising:
   (a) a base having a working surface;
   (b) first means on said working surface adapted for carrying art work to be photographed and bi-directionally movable in relation to said base in a forward and a reverse direction;
   (c) a first motor connected to said first means and operable in response to a signal for movement of said first means in said forward and reverse directions;
   (d) second means on said working surface adapted for carrying art work to be photographed and bi-directionally laterally movable in relation to said base in a left and a right direction;
   (e) a second motor connected to said second means and operable in response to a signal for movement of said second means in said forward and reverse directions;
   (f) digital control means connected to each of said motors and adapted for selectively operating said motors in response to digital signal;
   (g) signalling means connected to said control means and adapted for providing successive digital signals thereto for selectively operating said motors to move said first and second means in their said respective directions between randomly defined selected positions on said working surface;
   (h) input means adapted to cooperate with a data medium for transferring digital instructions to said signalling means;
   (i) said signalling means forming digital signals having a first characteristic for selecting which of said motors is to be activated, a second characteristic for determining the direction of operation of the selected motor, and a third characteristic for determining the extent of operation of said selected motor;
   (j) register means adapted for storing digital representations of said third characteristic;
   (k) means for incrementally diminishing said stored digital representations in said register means;
   (l) circuit means connected to said register means and cooperative with said digital control means for generating an operative signal for said selected motor to control the extent of operation thereof so long as said selected motor is operating said circuit means being further cooperative for preparing said input means in cooperation with the data medium to transfer a subsequent instruction to said signalling means;
   (m) a camera directed toward said art work on said working surface;
   (n) means connected to said camera and responsive to a fourth characteristic of said successive signals for controlling operation of said camera; and,
   (o) programmed means for advancing the data medium for a successive operation of said input means for transferring additional instructions.

2. The invention of claim 1 further including additional motor means including a bi-directional motor and adapted for rotating said base about an axis perpendicular to said working surface in a clockwise and counter-clockwise direction.

3. The invention of claim 1 further including additional motor means including a bi-directional motor and adapted for moving said base relative to said camera toward and away therefrom.

4. The invention of claim 1 wherein said motors are stepping motors operable in progressive movements in discrete intervals.

5. The invention of claim 1 wherein said register means stores a binary number which is diminished one binary digit at a time.

6. The invention of claim 1 including means responsive to a reference number in said register means, said means rendering said selected motor operative when the number in said register means differs from the reference number and holding said selected motor stationary when said register means stores the reference number.

7. The invention of claim 1, wherein:
   (a) said motors are stepping motors having an incremental movement in response to a single pulse which causes movement of said artwork of a small discrete measure;
   (b) pulse generating means;
   (c) means connecting pulses from said pulse generating means to said stepping motors to operate same for movement of said artwork of a small discrete measure; and,
   (d) said third characteristic of said signals controlling the quantity of pulses applied to said stepping motors to thereby obtain the desired movement of said artwork wherein movement from a beginning position to an ending position is accomplished in a plurality of incremental movement.

References Cited

UNITED STATES PATENTS

| | | | |
|---|---|---|---|
| 2,198,006 | 4/1940 | Garity | 352—87 |
| 2,763,182 | 9/1956 | Urban et al. | 88—24 |
| 2,876,004 | 3/1959 | Sink | 352—180 |
| 3,052,174 | 9/1962 | Berger | 88—24 |
| 3,183,770 | 5/1965 | Nyman et al. | 352—87 |
| 3,208,336 | 9/1965 | Vago | 88—24 |

JULIA E. COINER, *Primary Examiner.*

US. Cl. X.R.

352—180; 88—24; 352—50